Figure 1:
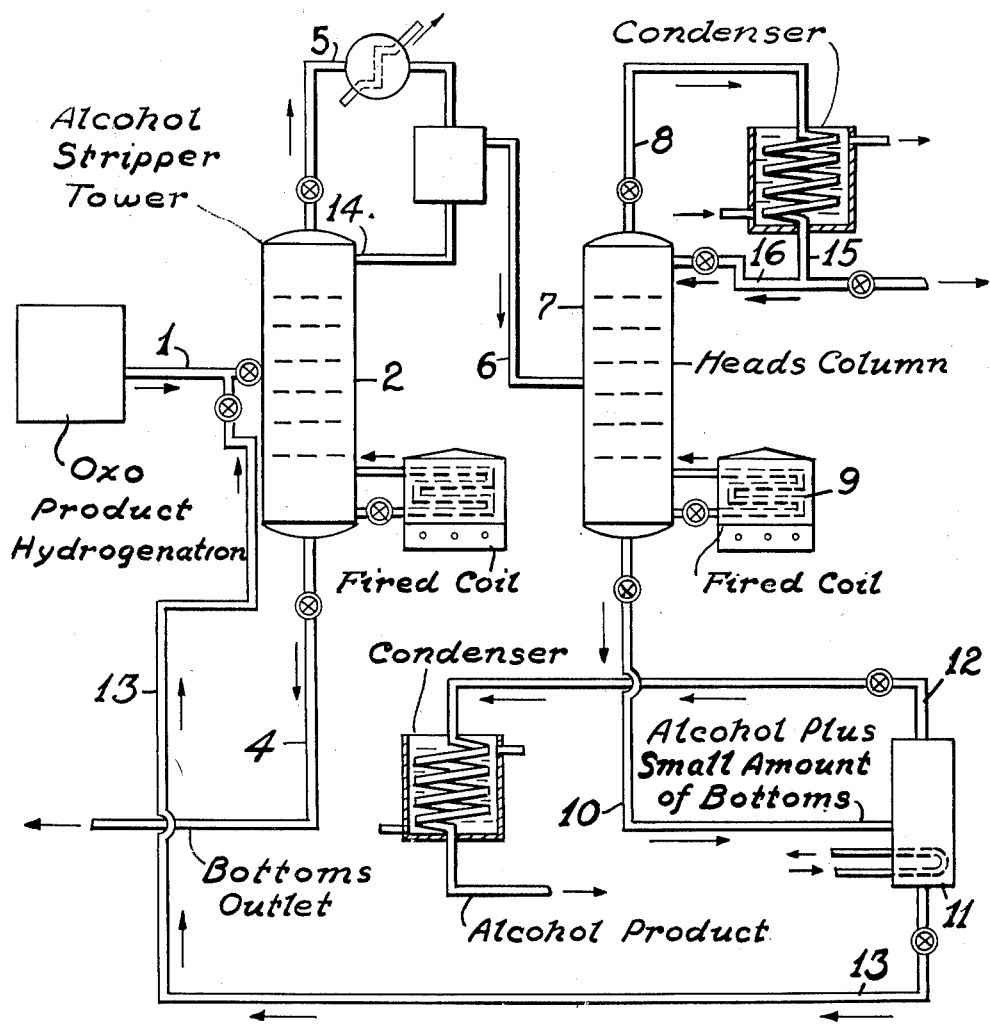

Patented Mar. 11, 1952

2,589,018

UNITED STATES PATENT OFFICE 2,589,018

DISTILLATION OF OXO ALCOHOLS

Charles E. Morrell, Westfield, Frank A. Biribauer, Cranford, and Carl S. Carlson, Roselle, N. J., assignors to Standard Oil Development Company, a corporation of Delaware Application December 31, 1948, Serial No. 68,472

6 Claims. (Cl. 202—40)

This invention relates to an improved process for the purification of crude alcohols, by a distillation method, and more specifically, to a method for purifying higher boiling alcohols which contain impurities of the type tending to undergo decomposition at the normal boiling point of the alcohol or alcohols in question.

Many alcohols which are of great commercial importance are prepared by synthetic processes and especially by the so-called oxo reaction. The term "oxo reaction" is a general term used to describe the preparation of oxygenated organic compounds by the reaction of carbon monoxide and hydrogen with olefinic hydrocarbons in the presence of a carbonylation catalyst. The method is used particularly for the manufacture of various primary alcohols, specifically octyl alcohols, by operations involving interaction of carbon monoxide, hydrogen, a hydrocarbon mixture containing substantial amounts of heptenes, and a cobalt carbonylation catalyst to form octyl aldehydes, and subsequent reduction of these aldehydes by catalytic hydrogenation to a mixture relatively high in octyl alcohols.

Primary alcohols of this general type are of great economic importance and interest because of their use as intermediates in the manufacture of plasticizers of the di-ester type. These alcohols have previously been supplied mainly by such comparatively costly procedures as aldol condensation of butyraldehydes, followed by dehydration, and hydrogenation of the resulting unsaturated octyl aldehyde. The oxo reaction and subsequent hydrogenation have been found to comprise a highly economical and valuable method for manufacturing octyl alcohols from cheap and readily available hydrocarbon material.

In the oxo or carbonylation stage of the process a large number of different types of reaction take place to form a variety of products. One of the primary reaction products will be aldehydes. These aldehydes themselves can undergo further reactions to yield other products. For instance, the aldehydes condense with each other to yield aldols. At least a part of the aldols undergo dehydration to alpha-beta-unsaturated aldehydes. Some ketones are also formed under the reaction conditions. A part of the aldehydes formed in the reaction zone are hydrogenated to alcohols and the alcohols so formed react with aldehydes and ketones present to give mixtures of acetals, hemi-acetals, and ketals. These compounds can undergo further reactions, including dehydration, to give ethers, particularly those of the unsaturated types. The alcohols can esterify the acids present to give esters. Hydrogenation of a part of the olefin starting feed stock, as well as some deoxygenation of oxygenated intermediates, gives some hydrocarbons in the final oxo product. In addition, other more complex and less known reactions also occur between the various intermediates and products obtained thereby yielding a mixture of higher boiling impurities and contaminants of the oxygenated type.

In the hydrogenation stage, the mixtures of acids, saturated and unsaturated aldehydes, alcohols, ethers, aldol condensation products, glycols, acetals, ketals and esters are hydrogenated in the presence of a suitable catalyst to yield more saturated products containing a higher percentage of alcohols and non-olefinic compounds. Some of these impurities, especially the unsaturated ethers, acetals, ketals, aldols and esters are quite unstable toward heat and the hydrolytic action of water. For instance, in general, the aldols, acetals, hemiacetals and ketals have a great tendency to undergo degradative decomposition reactions whenever the alcohol is subjected to a simple distillation regardless of whether the distillation be carried out at superatmospheric, atmospheric, or subatmospheric pressures. In many cases, thermally unstable esters are present and undergo both thermal and hydrolytic decompositions under distillation conditions.

To be more specific, if a crude fraction of isooctyl alcohol as produced by the oxonation of $C_7$ olefins, followed by hydrogenation, is distilled either in a batch or continuous manner and cuts removed according to increasing boiling point, then it is quite possible to obtain the following fractions:

1. A fraction containing unconverted olefin hydrocarbons, saturated hydrocarbons, and unhydrogenated aldehydes.
2. A fraction containing principally isooctyl alcohol contaminated with decomposition products of aldols, hemi-acetals, acetals, ketals, esters, ethers, and the like.
3. A fraction containing higher boiling materials including esters and unsaturates of low volatility, higher alcohols, decomposition products of acetals and undecomposed acetals, ethers, and ketals.

A mechanism which fits the facts in a general fashion may be formulated in which it is assumed that decomposition reactions of various thermally and hydrolytically unstable materials proceed to an appreciable extent at the distillation temperature of the alcohol being purified, in this particular case, the isooctyl alcohol. The decomposition reactions occurring always produce water, especially by aldol dehydration, and this water probably contributes further to decomposition reactions by its hydrolytic action, especially on esters, ketals, acetals and unsaturated ethers. The more volatile of the decomposition products, including various saturated and unsaturated aldehydes, water, and alcohols (including both isooctyl and other alcohols of lower boiling point), go overhead with the alcohol product and contaminate the latter. Any aldehydes which are, in general, quite volatile, are distilled over with the alcohol fraction in this manner and can subsequently combine very readily with the distilled alcohol product, reforming acetals and hemiacetals, which are likewise subject to a second decomposition process when a redistillation of the alcohol fraction is attempted. Furthermore, aldehyde and other decomposition products are objectionable because they lower over-all product purity, and, due to instability, cause difficulties in the use of the alcohol. It is believed, however, that this is an oversimplified and incomplete picture of the over-all situation.

It can readily be seen that it is difficult, if not impossible, to remove completely these acetals, aldehydes, and other interfering impurities from alcohols produced by such methods as the oxo reaction using straight distillation using successive steps for removing fractions of increasing boiling points. The presence of free aldehydes or potentially free aldehydes such as acetals or hemi-acetals in any kind of commercial alcohol product is objectionable for a number of reasons. First of all, the aldehydic compounds are relatively unstable toward air, elevated temperatures, and other various regularly encountered conditions to which chemicals are exposed when stored. As a result, impurities such as color bodies are produced upon storage, especially under varying temperature conditions. Any aldehydes present also react readily with a part of the alcohol, thereby reducing the amount of total alcohol present and the amount which would be readily available for other chemical reactions. Perhaps the most important commercial use for these higher molecular weight alcohols, such as the $C_8$ isooctyl alcohols produced by the oxo reaction, is in esterification reactions to form compounds of the diester type for use as plasticizers in resin and plastic compositions. Those of the phthalate and adipate type are widely manufactured. Even though an alcohol product of a synthetic source appears to be perfectly colorless, it frequently contains small amounts of impurities which form colored bodies during the subsequent acid-alcohol reaction. These colored materials are difficult to remove from the resulting high-boiling ester products and result in inferior esters which require additional and excessive purification prior to their use as plasticizers.

This same type of problem of unstable impurities also exists in connection with other alcohols made by the oxo reaction, particularly for the higher boiling alcohols of the range of $C_6$ to $C_{15}$ or higher. For example, the $C_9$ alcohols, prepared by the reaction of $C_8$ olefins such as diisobutylene with carbon monoxide and hydrogen may be purified in the same manner as that described herein for the purification of the $C_8$ oxo alcohols.

It can thus be seen that it is of great desirability to obtain the alcohol products, particularly those of the type obtainable from synthetic processes as the oxo process, as free of aldehydes, acetals and other chemically reactive and unstable substances as possible.

A very superior method has been found for accomplishing this purpose of getting pure alcohols relatively free from aldehydes and related impurities. This new method can be called a distillation type purification and consists essentially of at least two stages in a closely related sequence of operation.

This process can be used for purification of alcohols containing thermally unstable high boiling impurities obtained from any source, and is especially applicable to treatment of alcohols having from 4 to 15 carbon atoms. It finds particular application in purification of alcohols obtained by the so-called oxo reaction mentioned above and especially to alcohols of the $C_8$ and $C_9$ class, although the process can also be applied advantageously for other alcohols containing similar types of thermally unstable impurities, particularly alcohols obtained by hydrogenation of carbonyl compounds.

A typical $C_8$ crude oxo alcohol mixture such as can be employed as starting feed in this improved purification process has the following composition:

| | Wt. percent |
|---|---|
| Alcohol as $C_8$ | 65.0 |
| Aldehyde as $C_8$ | 1.8 |
| Acetal as $C_{24}$ | 3.7 |
| Ester as $C_9$ | 3.0 |
| Unsaturates as $C_7$ | 6.3 |
| Acid as $C_8$ | 0.1 |
| Water | 2.0 |
| Saturates and unknowns | 18.1 |

In the first stage, there is carried out a vaporization of the crude alcohol mixture including any acetals, hemi-acetals, and other thermally and hydrolytically unstable compounds. This vaporization may be done in any type of conventional still column. One critical factor in this first stage vaporization or distillation is that the bottoms temperature must be maintained sufficiently high to cause a substantial decomposition of the heat-unstable impurities, thereby releasing at least a portion, and preferably a major portion, of the combined alcohol. This bottoms should always be above the normal boiling point of the alcohol, and generally considerably above it. The amount of material taken overhead comparative to the amount of bottoms allowed to remain in the still will depend on the degree of decomposition of acetals and other unstable compounds obtainable at the bottoms temperature employed as well on the precise composition of the impurities in the alcohol since some types of impurities may be extremely resistant to thermal attack. The overhead vapor temperature of the first distillation stage should not be greatly in excess of the normal boiling range of the particular alcohol product which is being purified. In the case of isooctyl alcohol, the overhead temperature will be 170°–185° C. Obviously, the bottoms will be somewhat higher and may be considerably in excess of this, for instance, for the isooctyl alcohols the bottoms temperature may be 285°–320° C. and for the $C_9$ alcohols of the order of 305°–340° C. The bottoms temperature necessary in the first stage for substantial cracking of the unstable high boiling impurities will depend to a more or less extent on the exact nature of the alcohol being purified but will obviously always be considerably in excess of the boiling point of the alcohol.

In the second stage of operation, the overhead from the first stage is passed as quickly as possible, with or without intermediate condensation, to a second vaporization or distillation column. A partial condenser may be used to return a part of the overhead to the first column as reflux and pass a part to the second column. Here, all the materials presents in the feed to the second column, and boiling at temperatures below the desired alcohol product are removed overhead from this column. This overhead product will include any decomposition products boiling below the alcohol. It must be emphasized that a minimum of time and operation steps is of critical importance between the collecting of overhead vapor from the first stage distillation and subjecting these vapors to the second stage distillation operation. The importance of keeping these factors to a minimum lies in preventing any substantial amount of the aldehydic materials in the overhead from stage one from recombining with a portion of the huge excess of alcohol, thereby regenerating the acetals and negating the beneficial effects obtained in the initial distillation.

In order to obtain the desired purified alcohol from the second vaporization zone, a number of different procedures may be followed. One possible alternative which may prove convenient is to withdraw directly the alcohol product, preferably as a vapor stream, from a point in the second column at a point located somewhat below the point of feed of the overhead from the first column. By this procedure, it is possible to obtain a good alcohol product relatively dry and free of unwanted contaminants. The side stream alcohol product may be taken to a third zone, if desired, for a further distillation or topping step.

A second procedure which may be followed for obtaining the product is carrying the total bottoms of the second distillation zone, which contain the desired alcohol, to a third vaporization zone from which the purified product can be removed overhead and thereby separated from the small quantity of residual higher boiling materials.

Other modifications will also be suggested to one skilled in distillation techniques. In any case, regardless of the exact manner in which the alcohol product is removed from the small quantity of residual high boilers, it is highly desirable to maintain as low a bottoms temperature in the second vaporization step as possible and preferably not to allow a temperature appreciably higher than the boiling range of the alcohol itself. This precaution is, of course, not a required one for the first distillation stage. In fact, it is highly desirable to maintain considerably higher temperatures in the first zone in order to decompose a greater amount of the high boiling impurities. One very convenient way in which to maintain a low bottoms temperature in the second zone is to allow a certain amount of the alcohol to remain in the still bottoms in the second column.

If very extensive thermal decomposition of the acetals and other high boiling materials has been obtained in the first stage, then it may be entirely possible to use somewhat higher temperatures in the alcohol recovery step.

Since, in general, for efficient operation, it would seem desirable to recover ultimately the alcohol remaining in the bottoms from the alcohol recovery tower, these bottoms may be recycled to the first distillation stages for further decomposition.

The degree of purification accomplished by this process can readily be evaluated in any number of ways. One of the simplest is by observation of the number of degrees of spread in boiling range of the alcohol product obtained. As is the general rule in chemical practice, the narrower boiling range is an indication that a purer product has been obtained. Color stability tests, particularly those involving esterification, can also be used to give an indication of any color producing impurities present.

If so desired, pressures other than atmospheric can be employed in either of these stages. Under certain circumstances, the use of sub-atmospheric pressures in the second step may be beneficial. Super-atmospheric pressures in the first step may be employed to obtain higher temperatures. While some fractionation effected by the use of reflux in the first stage is desirable, it is possible and considered within the limits of this invention, to carry out this operation, without reflux, e. g. by the use of a simple flashing operation in a heated vessel, coil or other suitable equipment. Suitable temperatures in this type of operation are about the same as when employing reflux in a conventional distillation column using reflux in the first step.

*Example 1*

This example will be described with reference to Figure 1. A mixture of octyl alcohols, prepared by catalytic reaction of carbon monoxide and hydrogen with $C_7$ olefins with a composition such as that shown above, is fed by line 1 into an intermediate point of an alcohol stripper fractionating tower 2 which is operated at atmospheric pressure. The column temperature must be controlled and heat is added in any suitable manner, for instance, by the fired coil 3. A vapor temperature of the order of 185° C. is maintained at the top of the column. At a reflux ratio of approximately 2 to 1, an overhead product consisting of alcohol and certain other lower boiling products including some aldehydic materials is removed by line 5. In the lower portion of the column much higher temperatures of the range of 285°–320° C. are maintained in order to decompose thermally the acetals, hemi-acetals and certain other impurities which are heat sensitive and some of which break up to yield additional octyl alcohol. A bottoms product containing some alcohol, esters, olefins, ethers and other more thermal stable materials is removed from stripper tower 2 by line 4. The overhead product taken out by line 5 which is relatively high in the desired alcohol product, is taken as quickly as possible by lines 5 and 6 to an intermediate point of a so-called "heads column" 7. The product in line 5 may be subjected to a partial condensation before introducing it into column 7 by line 6 but even this step can be avoided if the transfer is immediate, as is most desirable to obtain the best purification. A part of the alcohol product removed from column 2 by overhead line 5 may be returned as reflux to the column 2 through inlet line 14. If some little time will lapse before the second column step is to be carried out, then a condensation will be desirable as the lower temperatures thus obtained will tend to avoid recombination of the reactive aldehydic materials present in the overhead from tower 2. The ratio of the amounts of material taken as overhead from tower 2 to that taken out as bottoms from tower 2 may be varied somewhat widely and will depend in great degree on the purity of product desired, the further steps contemplated, and on the composition of the initial feed stock. It has been found that from 70% to 80% of the total feed can be taken overhead and, correspondingly, from 20% to 30% removed as bottoms. It has further been found that the higher the percentage of material removed overhead, the more impure the final alcohol product obtained. This relationship seems to be true within limits.

The overhead material from tower 2 enters the heads column 7 at a point intermediate and preferably somewhat above the central portion. This column likewise is suitably heated as by a heating coil 9. The overhead temperature is preferably kept low, of the order of 90°–150° C. An overhead stream of volatiles containing some alcohol is removed by line 8 and condensed. A part or all of this overhead material can be returned as reflux to column 7 by lines 15 and 16. In the preferred mode of operation, this should contain all materials boiling below 180° C. From the lower portion of the tower by line 10 there is removed the major portion of the desired alcohol with a small amount of bottoms product. The temperature in the lower portion of this column 7 should not exceed about 210° C. This cut from line 10 is taken directly to an auxiliary still 11 from which octyl alcohol of at least 98% purity is removed overhead by line 12 and condensed. A bottoms product from still 11 is recycled by lines 13 and 1 back to stripper tower 2 to undergo a second thermal decomposition.

*Example 2*

Figure 2:
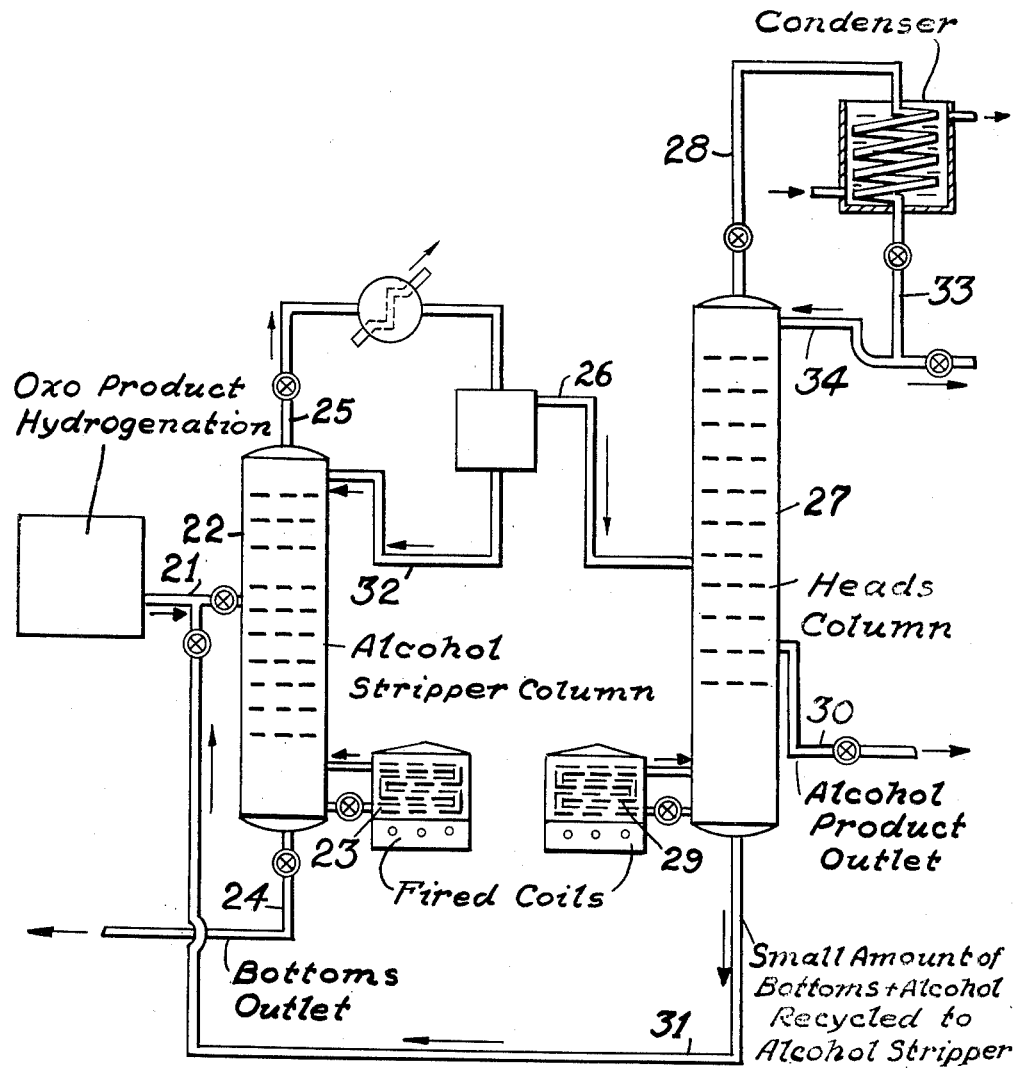

This example can best be understood by reading it with reference to Figure 2. A feed mixture such as is used in Example 1 whose typical composition is shown above, is fed by line 21 to an alcohol stripper column 22 at atmospheric pressure. The overheads product is taken by lines 25 and 26 directly to the "heads column" 27. The temperatures in tower 22 are controlled by heating coil 23 in the same desired ranges as for the tower 2 in Example 1. A bottoms product is removed through line 24. The overhead alcohol rich fraction from line 26 is fed to "heads column" 27 at an upper intermediate point. A part of this overhead fraction may be returned to column 22 by line 32 as reflux. This column 27 is heated by a heating coil 29. From this column 27 the material boiling below 180° C. is removed overhead at a relatively high reflux ratio and at least a part of which may be returned to the column 27 as reflux by lines 33 and 34, while from a lower but intermediate portion of the column 27 there is removed by line 30 a desired octyl alcohol product having a boiling range of 180°–195° C. The temperature in this portion of the column 27 should be controlled rather carefully to near the boiling range of the alcohol product. From the bottom of column 27 there is removed by line 31 a small amount of bottoms which is recycled by line 21 back to the alcohol stripper column 22. The temperature throughout column 27 should be kept as low as possible and even in the bottoms should not exceed about 220° C. The relative proportions of materials removed as the cuts from column 27 will vary somewhat depending on conditions of column 22 operation, feed stock composition, and purity of product desired.

In a typical case where about 80% of the material put into column 22 was fed to column 27, 15% of volatiles was removed overhead, 60% was removed as desired octyl alcohol product, and about 5% was taken out by line 31 as bottoms for recycle to column 22. Operating in this fashion, an alcohol purity of not less than 98% was obtained. Where less material is taken from column 22 as overhead and fed to column 27, and more overhead is taken from column 27 as volatiles, an alcohol fraction of at least 99% purity is obtained.

What is claimed is:

1. An improved continuous distillation process for the purification of a mixture of crude alcohols containing high boiling unstable impurities and obtained by the reaction of olefins with carbon monoxide and hydrogen and subsequent hydrogenation of the aldehydes resulting therefrom, which comprises introducing said mixture of crude alcohols into a primary stripping column, maintaining the bottoms temperature in said stripping column substantially above the normal boiling point of the alcohol, whereby substantial amounts of the high boiling unstable impurities are decomposed to volatile products, maintaining continuous reflux within the stripping column, removing an alcohol rich overhead vapor stream from said stripping column, passing said vapor stream immediately into a secondary column in which the temperatures are maintained substantially lower than those in the primary stripping column, removing as an overhead vapor stream substantially all volatiles boiling below the alcohol, removing an alcohol concentrate as a vapor stream from an intermediate portion of said secondary column, and recycling the bottoms product from the secondary column to the lower portion of the primary stripping column.

2. A continuous distillation process for the purification of a crude C$_8$ alcohol containing high boiling heat unstable impurities and obtained by the reaction of a mixture of C$_7$ olefins with carbon monoxide and hydrogen and subsequent hydrogenation of the aldehydes resulting therefrom, which comprises introducing said crude C$_8$ alcohol into the intermediate portion of a primary fractionating column, maintaining temperatures of 285°–320° C. in the bottom portion of said column whereby substantial amounts of the high boiling unstable impurities are decomposed to volatile products, maintaining continuous reflux within said primary fractionating column, removing overhead an alcohol rich vapor stream, passing at least a portion of said alcohol rich vapor stream immediately to a secondary column, in which the temperatures are maintained substantially lower than those of the primary fractionating column, removing substantially all volatiles boiling appreciably below the alcohol as an overhead vapor stream, removing a C$_8$ alcohol concentrate as a vapor stream from an intermediate portion of said secondary column, and recycling the bottoms product of said secondary column to the lower portion of the primary fractionating column.

3. An improved continuous distillation process for the purification of a crude alcohol containing high-boiling impurities and obtained by the reaction of olefins with carbon monoxide and hydrogen and subsequent hydrogenation of the aldehydes resulting therefrom, which comprises feeding the said crude alcohol into an initial fractionation zone, maintaining the bottoms temperature in said initial fractionation zone substantially above the normal boiling point of the alcohol, maintaining continuous reflux within the initial fractionation zone, removing an alcohol-rich vapor stream essentially free of higher-boiling unstable impurities from said initial fractionation zone, passing said alcohol-rich vapor stream immediately into a second fractionation zone, removing as an overhead vapor stream substantially all volatiles boiling below the alcohol from an upper portion of said second fractionation zone, and removing an alcohol-enriched vapor stream from a lower portion of said second fractionation zone.

4. An improved continuous distillation process for the purification of a mixture of crude alcohols containing high-boiling, unstable impurities and obtained by the reaction of olefins with carbon monoxide and hydrogen and subsequent hydrogenation of the aldehydes resulting therefrom, which comprises introducing said mixture of crude alcohols into a primary fractionating column, maintaining the bottoms temperature in said primary fractionating column substantially above the normal boiling point of the alcohol, maintaining continuous reflux within said primary fractionating column, removing an alcohol-rich overhead vapor stream from said primary fractionating column, passing said alcohol-rich vapor stream immediately into a secondary fractionating column in which the temperatures are maintained substantially lower than those in said primary fractionating column, removing substantially all volatiles boiling appreciably below the alcohol from said secondary fractionating column as an overhead vapor stream, passing the total bottoms of said secondary fractionating column including the alcohol to a third distillation zone, removing a purified alcohol vapor stream as an overhead product from said third distillation zone, and recycling the bottoms from said third distillation zone to an intermediate point of the primary fractionating column.

5. A continuous distillation process for the purification of a crude $C_8$ alcohol containing high-boiling heat unstable impurities and obtained by the reaction of a mixture of $C_7$ olefins with carbon monoxide and hydrogen and subsequent hydrogenation of the mixture of aldehydes resulting therefrom, which comprises introducing said crude $C_8$ alcohol into the intermediate portion of a primary fractionating column, maintaining temperatures of 285–320° C. in the bottom portion of said primary fractionating column whereby substantial amounts of the high-boiling unstable impurities are decomposed to volatile products, maintaining continuous reflux within said primary fractionating column, removing overhead a $C_8$ alcohol-rich vapor stream from said primary fractionating column, passing at least a portion of said $C_8$ alcohol-rich vapor stream immediately into a secondary column in which the temperatures are maintained substantially lower than those of the primary fractionating column, removing substantially all volatiles boiling appreciably below the $C_8$ alcohol as an overhead vapor stream from said secondary column, passing the total bottoms of said secondary column including the alcohol into a third distillation zone, removing from said third distillation zone a purified $C_8$ alcohol fraction as an overhead vapor stream, and recycling the bottoms product from the third distillation zone to an intermediate point of said primary fractionating column.

6. An improved continuous distillation process for the purification of a mixture of crude alcohols containing high-boiling unstable impurities and obtained by the reaction of olefins with carbon monoxide and hydrogen and subsequent hydrogenation of the aldehydes resulting therefrom which comprises introducing said mixture of crude alcohols into a primary fractionating column, maintaining the bottoms temperature in said primary fractionating column substantially above the normal boiling point of the alcohol, maintaining continuous reflux within said primary fractionating column, removing an alcohol-rich overhead vapor stream from said primary fractionating column, passing at least a portion of said vapor stream immediately into a second fractionating column in which the temperatures are maintained substantially lower than those in the primary fractionating column, removing as an overhead vapor stream from said secondary fractionating column substantially all volatiles boiling below the alcohol, removing an alcohol concentrate as a distillate from high-boiling bottoms of said secondary fractionating column, and recycling the high-boiling bottoms product of the secondary fractionating column to a lower portion of the primary fractionating column.

CHARLES E. MORRELL.
FRANK A. BIRIBAUER.
CARL S. CARLSON.

REFERENCES CITED

The following references are of record in the file of this patent:

UNITED STATES PATENTS

| Number | Name | Date |
| --- | --- | --- |
| 1,702,495 | Clapp | Feb. 19, 1929 |
| 2,186,617 | Othmer | Jan. 9, 1940 |
| 2,337,489 | Patterson | Dec. 21, 1943 |
| 2,417,886 | Redcay | Mar. 25, 1947 |